US008160248B2

(12) United States Patent
Dellow

(10) Patent No.: US 8,160,248 B2
(45) Date of Patent: Apr. 17, 2012

(54) AUTHENTICATED MODE CONTROL

(75) Inventor: Andrew Dellow, Minchinhampton (GB)

(73) Assignee: Broadcom Corporation, Irvine, CA (US)

( * ) Notice: Subject to any disclaimer, the term of this patent is extended or adjusted under 35 U.S.C. 154(b) by 393 days.

(21) Appl. No.: 12/385,258

(22) Filed: Apr. 2, 2009

(65) Prior Publication Data

US 2010/0254536 A1    Oct. 7, 2010

(51) Int. Cl.
*H04L 29/06*    (2006.01)

(52) U.S. Cl. ................... 380/44; 380/47; 726/29

(58) Field of Classification Search ............ 380/44, 380/281, 282, 284
See application file for complete search history.

(56) References Cited

U.S. PATENT DOCUMENTS

| | | | | |
|---|---|---|---|---|
| 3,789,131 A | * | 1/1974 | Harney | ............ 380/241 |
| 5,088,091 A | * | 2/1992 | Schroeder et al. | ......... 370/406 |
| 7,492,897 B1 | * | 2/2009 | Eskicioglu et al. | ........... 380/231 |
| 2005/0172132 A1 | * | 8/2005 | Chen et al. | ............ 713/180 |
| 2008/0152134 A1 | * | 6/2008 | Asano | ................ 380/45 |

OTHER PUBLICATIONS

Pedder, David et al. "The Architectural Options and Benefits of System-in-Package", UKTI Coventry 17, Nov. 2008, TWI Ltd.*

* cited by examiner

*Primary Examiner* — Jung Kim
*Assistant Examiner* — Ngoc D Nguyen
(74) *Attorney, Agent, or Firm* — Sterne, Kessler, Goldstein & Fox P.L.L.C.

(57) ABSTRACT

Methods and systems for authenticated mode control in controlled devices are disclosed. A method for changing a mode in a controlled device from a current mode includes selecting one of several available key derivation functions based on a target mode, generating a target mode specific root key using a global root key and the selected key derivation function, and the use of that root key to affect a change of the controlled device to a target mode. Corresponding devices and systems are also disclosed. In one embodiment, the methods are applicable to a cable television distribution system and the changing of the operating mode of a set top box from one conditional access provider to another.

20 Claims, 9 Drawing Sheets

AUTHENTICATED MODE CONTROL

BACKGROUND OF THE INVENTION

1. Field of the Invention

The present invention relates in general to authentication, and in particular to authenticated changing of modes in controlled devices.

2. Background Art

Broadcast media services, in general, are operated according to a model where a service provider receives programming content from one or more content providers at a service provider facility. The service provider then distributes that programming content, possibly after additional processing, to numerous subscribers over a media distribution network. The service provider can be a large multi service operator (MSO) that provides cable television as a broadcast media service. As the technologies related to multimedia and data transmission networks improve, and also as technologies such as high definition television displays that enhance the corresponding user experience improve, broadcast media services are relied on to distribute an increasing amount of content. The media distribution networks of MSOs are utilized to distribute an increasingly substantial portion of the digital content that flows into homes and businesses. The digital content includes television programming, video on demand, pay-per-view content, music, interactive content, games, educational content, remote monitoring services, etc.

The service provider typically operates the facility in which content from various sources is received, aggregated, processed, and distributed. The service provider facility that distributes content over a service provider network, such as a cable television network, is generally referred to as a headend. In many instances, the service provider also provides equipment, such as a set-top box (STB), to be placed at the premises of each subscriber. The STB is, in general, a controlled device that is controlled by the service provider from the headend of the corresponding media distribution network. The STB includes the functionality to receive content transmitted from the service provider headend, and to descramble and/or decrypt that content. The subscriber can, and usually does, couple at least one device such as a television to the STB.

An STB may include other capabilities in addition to descrambling and/or decrypting. For example, many STBs enable interactivity for the user, such as to order pay per view movies, to enable personal video recording and viewing, and to use on demand viewing capabilities, etc.

The pirating of programming content by third parties and the unauthorized use of content by subscribers are significant concerns to service providers. Conditional access is a framework used in many broadcast media distribution systems to prevent or reduce the pirating and unauthorized use of content. A service provider engages the services of a conditional access provider to scramble and/or encrypt content, such as programming content, before transmission over the media distribution network, and to descramble and/or decrypt that content at an STB of an authorized subscriber.

The keys (i.e., cryptographic keys) used for scrambling/descrambling and/or encryption/decryption may be generated and/or verified by the conditional access provider. The strength of the content protection is to a substantial extent dependent on the secrecy of the keys and characteristics of the keys and algorithms used for encryption/decryption and/or scrambling/descrambling. In addition to the cryptographic strength of each key, the secrecy of the keys is also of great importance.

In a typical conventional broadcast media distribution network a single conditional access provider protects the programming content that is distributed. Also, STBs are manufactured and/or initialized to be specific to a particular service provider and conditional access provider. In a typical scenario, a conditional access provider will create and/or otherwise obtain one or more unique keys for each new STB that is manufactured for deployment in a network serviced by that conditional access provider. The collection of these key and STB pairs is often referred to as the conditional access provider's key database. The key database is accessible to the service provider's headend, and therefore the one or more keys that correspond to each STB are known to the headend.

Typically, a conditional access provider also provides a black box device that is used to initialize each STB at the time of manufacture with one or more keys that are to be subsequently used in the STB when the STB is activated in a network of a service provider. One or more keys from the black box device can be written into the one time programmable (OTP) memory of each STB. For example, keys from the black box device can be securely written to a system-on-a-chip (SoC) that is then included in an STB. In some cases, the keys are written into the OTP memory in an obfuscated form to make unauthorized access to the keys more difficult, and each key is de-obfuscated only at the time of use.

It may be desirable to have STBs that are usable in the networks of multiple service providers. Particularly, as STBs become capable of much more functionality than the decoding and delivering of received content, subscribers can increasingly seek to have STBs that can operate with multiple service providers and/or multiple media distribution networks. Also, the conditional access provider servicing an STB can change due to several situations, such as, the service provider switching conditional access providers, another conditional access provider operating in the same network, or the STB being moved to a new network.

When the conditional access provider is changed, an STB can no longer receive programming content in a manner useful to the subscriber unless another conditional access provider's keys are made available to the STB. To be able to receive programming content protected by more than one conditional access provider, conventionally all conditional access providers that want to send content to an STB would be required to store their corresponding key or keys in the STB at the time of manufacture. For example, an OTP memory in an STB can be programmed with the key databases of each conditional access provider that want to provide services to that STB. Also, each headend would have access to the key databases of each conditional access provider that can provide services to any STB in the corresponding network. This approach generally leads to a conditional access provider having to share its keys, particularly the encryption keys, with other conditional access providers. In deployed networks the sharing of keys also takes place due to the inability to store more than a very limited number of keys in the memory of a single SoC or STB, and as a result of the need to support an STB when it change over to a conditional access provider for which the STB does not have preprogrammed key information. Such sharing of keys can expose one conditional access provider to the weaknesses in key management of another conditional access provider.

Therefore, although enabling an STB to operate with multiple conditional access providers provide numerous advantages, the sharing of encryption keys between conditional access providers unnecessarily exposes a media distribution system to the weaknesses of the less secure conditional access providers. For example, if conditional access provider A has its key database exposed to an attacker, that attacker may now be able to attack a second service provider network if the exposed keys are shared with a conditional access provider who services the second service provider network. Clearly, methods and systems to enable an STB to receive programming content through multiple conditional access providers without sharing of encryption keys would be useful.

BRIEF SUMMARY OF THE INVENTION

Methods and systems for authenticated mode control in controlled devices are disclosed. In one embodiment a method for changing a mode in a controlled device from a current mode includes selecting a target key derivation function from a plurality of key derivation functions where the target key derivation function corresponds to a target mode, generating a target root key by providing a global root key as input to the target key derivation function, and changing the mode in the controlled device from the current mode to the target mode using one or more keys from a key ladder that is initialized with the target root key.

A method to change a mode from a current mode, according to another embodiment includes, selecting a current key derivation function from a plurality of key derivation functions where the current key derivation function corresponds to the current mode, generating a current root key by providing a global root key as input to the current key derivation function, and changing the controlled device from the current mode to a target mode using one or more keys from a key ladder that is initialized with the current root key.

Another embodiment is a controlled device including a memory configured with at least one global root key, a key derivation function module configured with a plurality of key derivation functions where a first key derivation function from the plurality of key derivation functions is assigned to a first mode and where a second key derivation function from the plurality of key derivation functions is assigned to a second mode, a key generator module configured to generate a root key using the global root key and the first key derivation function, and a key management module configured to use the root key to obtain one or more secret keys from messages received from an authorizing entity.

Yet another embodiment is a media delivery system having a media distribution network, a media distribution center, and at least one controlled device. The media distribution center includes a global root key database having at least one global root key that is known to one or more conditional access systems, at least one key derivation function, wherein the key derivation function corresponds to one of the one or more conditional access systems, a key generator module configured to generate an encryption key using the at least one global root key and the at least one key derivation function; and a mode controller module configured to generate a mode authorization request, wherein the mode authorization request is encrypted using the encryption key. The controlled device includes a memory having the at least one global root key, a key derivation function module having a plurality of key derivation functions including said key derivation function, a key generator module configured to generate a decryption key using the at least one global root key and said key derivation function, and a mode control module configured to verify a mode request using said mode authorization message, and to initiate a mode change according to the verified mode request.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION OF THE INVENTION

Figure 1:
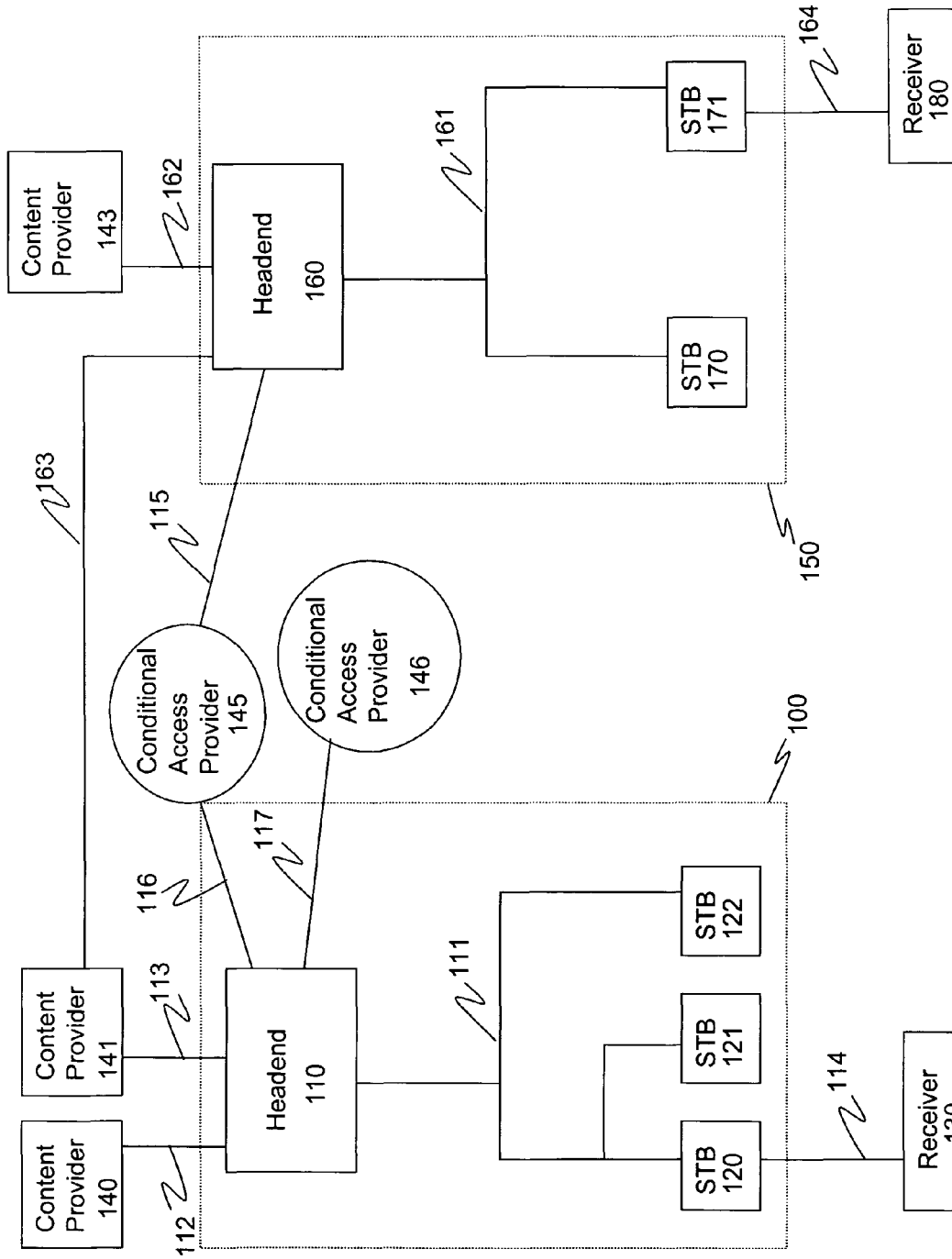
FIG. 1 illustrates media distribution systems according to an embodiment of the present invention.

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Overview

This disclosure presents a novel approach to the authenticated changing of operating modes in controlled devices. A particularly advantageous use of the novel approach described herein may be to have a single controlled device, such as a set-top box (STB), that is capable of operating in the networks of multiple service providers and receiving conditional access protected content from multiple service providers and/or multiple conditional access providers. Numerous other advantageous uses of the novel approach exist, some of which are described herein.

The "mode" or "operating mode" of a controlled device, as used herein, determines whether the controlled device can receive services and/or content in an authorized manner from a controller such as a service provider and/or conditional access provider. For example, in mode MODE-A, a controlled device can receive services and content only from conditional access provider A, and in mode MODE-B, only from the conditional access provider B. As described above, conventional approaches to changing operating modes of controlled devices in an authenticated manner involve the sharing of keys used for encryption between conditional access providers. Other conventional approaches use add-on modules to the STB such as Smart Cards containing security keys that can be swapped-in when conditional access providers change. Embodiments of the present invention can substantially reduce the security risks associated with the authenticated changing of modes in controlled devices. For example, embodiments of the present invention do not require that secret keys of one controlling entity are shared with a second entity that wishes to control the same controlled device. Also, embodiments of the present invention can be implemented in a STB without the need for relatively expensive add-on cards etc. As the volume and variety of content that are distributed over media distribution networks grow, the provision of conditional access and the flexibility in configuring controlled devices to receive conditional access protected content becomes more important in enabling service providers to ensure that their programming content is not pirated and/or used in unauthorized ways.

For purposes of clarity, the description below is primarily based on media distribution systems in general and cable television distribution system in particular. Frequently described example embodiments include conditional access provision for a cable television system. A person of ordinary skill in the relevant arts will understand that embodiments of the present invention can also include systems other than media distribution systems, such as remote surveillance systems, remotely managed server or processing systems, and various other systems that include devices that are remotely managed and/or controlled. For example, an embodiment of the present invention can enable a monitoring unit located in a customer home to change its internal operating mode such that in case of a security alarm it will dial out to a newly configured alarm monitoring service instead of the initially configured service.

A Media Distribution System

FIG. 1 shows two media distribution systems 100 and 150, according to an embodiment of the present invention. Media distribution systems 100 and 150 can include cable television distribution systems, satellite television distribution systems, and distribution systems for other content such as multimedia, games, or interactive content. In one embodiment, media distribution system 100 includes a headend 110, a media distribution network 111, and one or more set-top boxes (STB) 120, 121, and 122. Content, such as cable television programming, can be received at headend 110 from content providers 140 and 141 over interfaces 112 and 113, respectively. Each STB can have one or more coupled devices for presenting content received from media distribution system 100 to a subscriber. For example, receiver 130 can be coupled to STB 120 through an interface 114. Conditional access providers 145 and 146 are coupled to headend 110 through interfaces 116 and 117, respectively.

For example, media distribution system 100 can be a cable television distribution system owned by one cable television service provider, while media distribution system 150 can be a satellite television distribution system owned by one satellite television service provider. Cable television service providers and satellite television service providers, in general, own their respective media distribution networks 111 and 161. Content providers, such as content providers 140, 141, and 143, provide content that is distributed by cable television service providers and satellite television service providers over their distribution systems 100 and 150, respectively.

Content providers 140, 141, and 143 can include various content producers and content distributors such as entertainment and news studios. For example, in one embodiment, television media distribution systems 100 and 150 can both be provided with content from news producers such as Cable News Network (CNN) and other entertainment and educational programming providers such as Public Broadcasting System (PBS).

Each content provider can provide its content to one or more media distribution systems. For example, content providers 140, 141, and 143 can provide their content to one or more media distribution networks, such as media distribution networks 100 and 150, through connections such as connections 112, 113, 162 and 163. Connections 112, 113, 162, 163 can include one or more network communication technologies such as Ethernet, IEEE 802.11, Digital Subscriber Line (DSL), leased line telecommunications circuits, and such other connection technologies and protocols that are used to distribute audio, video, and other data.

Headends 110 and 160 are typically service providers' facilities that include the functionality to receive content from various content providers and to transmit the content over media distribution networks 111 and 161, respectively. In one embodiment, cable television provider headend 110 includes devices to decode, process, store, and distribute audio, video and other content received from content providers 140 and 141. Headend 110 is further described in relation to FIG. 2 below. Also, in an embodiment, headend 160 includes functionality similar to headend 110, but is configured to distribute the content it receives from content providers 141 and 143 over another media distribution network 161. For example, media distribution network 161 can be a satellite network.

Media distribution network 111 couples headend 110 to a plurality of controlled devices such as STBs 120, 121, and 122. Media distribution network 161 couples headend 160 to a plurality of devices such as STBs 170 and 171. Media distribution networks 111 and 161 can include a media delivery network such as cable television network of coaxial cable, fiber-optics, or hybrid fiber coax, a satellite broadcast network, Ethernet, IEEE 802.11, Digital Subscriber Line (DSL), leased line telecommunications circuits, and such other connection technologies and protocols that can be used to distribute audio, video, and other data. A person of ordinary skill in the art understands that media distribution networks 111 and 161 can comprise a variety of network topologies, technologies, and devices, while being consistent with the teachings of the present disclosure.

STBs 120, 121, 122, are controlled devices, typically remotely located, that receive content, such as cable television programming content, from corresponding headends 110 or 160. In some embodiments of the present invention, controlled devices include STBs located in subscriber premises. For example, cable television networks can require a STB at each subscriber premises to receive programming content, to decode programming content, to enable the subscriber to interact with the cable distribution network, and/or to facilitate various other services to the subscriber. The STB is, in general, controlled by the corresponding headend, for example, to enable or disable various services from the cable television provider to the subscriber.

To facilitate the communication between a headend and a controlled device coupled to that headend one or more communication protocols may be used. For example, Digital Video Broadcasting (DVB) is a set of standards for broadcasting digital video in systems such as cable television systems and satellite television systems. Digital Video Broadcasting-Conditional Access (DVB-CA) is a related standard that defines messages and interactions between a headend conditional access provider and the conditional access related hardware or software in a controlled device. The DVB-CA standard, for example defines Entitlement Management Messages (EMM) and Entitlement Control Messages (ECM) that flow from the headend to controlled devices in the corresponding network. EMM are used to communicate user level conditional access information and authorizations, and ECM are used to communicate program level information and authorizations. For example, according to an embodiment of the present invention, messages sent from headend 100 to STB 120 to cause STB 120 to change mode can include EMM and ECM. A controlled device, such as an STB, is further described in relation to FIG. 3 below.

Each controlled device, in general, is coupled to one or more receiving devices that present the content received by the control device to a subscriber. For example, STB 120 is connected to a receiver 130 and STB 171 is connected to receiver 180. Receivers 130 and 180 can include televisions or other display devices, audio playback devices, audio or video recording devices, gaming devices, or computers. In should also be noted that in some embodiments, controlled device or STB 120 can be merged with receiver 130. Receivers 130 and 180 can be connected to the respective STB in one or more of several connection devices such as a High Definition Media Interface (HDMI), Digital Visual Interface (DVI), Firewire, Ethernet, IEEE 802.11, and the like.

Conditional access providers 145 and 146 provide media distribution system 100 with content protection so that subscribers can be appropriately charged for services and content. For example, with respect to pay per view video, the conditional access provider enables the appropriate scrambling and/or encrypting of the pay per view programming content such that it is only available to subscribers who duly purchased the content. Conditional access providers can also enable the authentication of subscribers and associated STBs that are connected to the network of a service provider. Content, such as programming content, that are protected by a conditional access provider is referred to herein as conditional access protected content. It should be noted that in some embodiments, conditional access providers and service providers can be the same entities. The conditional access provider may also be considered, in general, as an authorizing entity that authorizes a particular mode in a controlled device.

Conditional access providers can obtain security certificates and/or security keys (e.g., global root key described below) from a central security authority. In some embodiments, the generation of keys can be done by the respective conditional access providers while a central authority provides the service of authenticating the validity of each of the conditional access providers and their generated keys. In yet other embodiments, keys are generated and authentication is provided by a conditional access provider and no central authority is required. In general, each conditional access provider services a media distribution network with separate unique keys. For example, even if conditional access provider 145 services both media distribution system 100 and 160, separate sets of unique keys can be used for each distribution system.

The functionality to store keys provided by conditional access providers and the functionality to perform such scrambling/descrambling and/or encryption/decryption as necessary to provide are, in general, located on the headend and on each controlled device. Interfaces 115, 116, and 117 can provide an electronic or other coupling to a facility of the conditional access provider, for example, for purposes of transferring keys.

Each STB 120, 121, 123, 170 or 171, is authorized to receive and decode conditional access protected content from one or more conditional access providers. In general, each STB is configured for one or more media distribution networks and/or conditional access providers, for example, by writing one or more unique keys in to the STB's one time programmable (OTP) memory at the time of manufacture and providing one or more key derivation functions unique to each conditional access provider. Further description of pre-configuration of keys in each STB is described in relation to FIG. 3.

A Media Distribution Center

Figure 2:
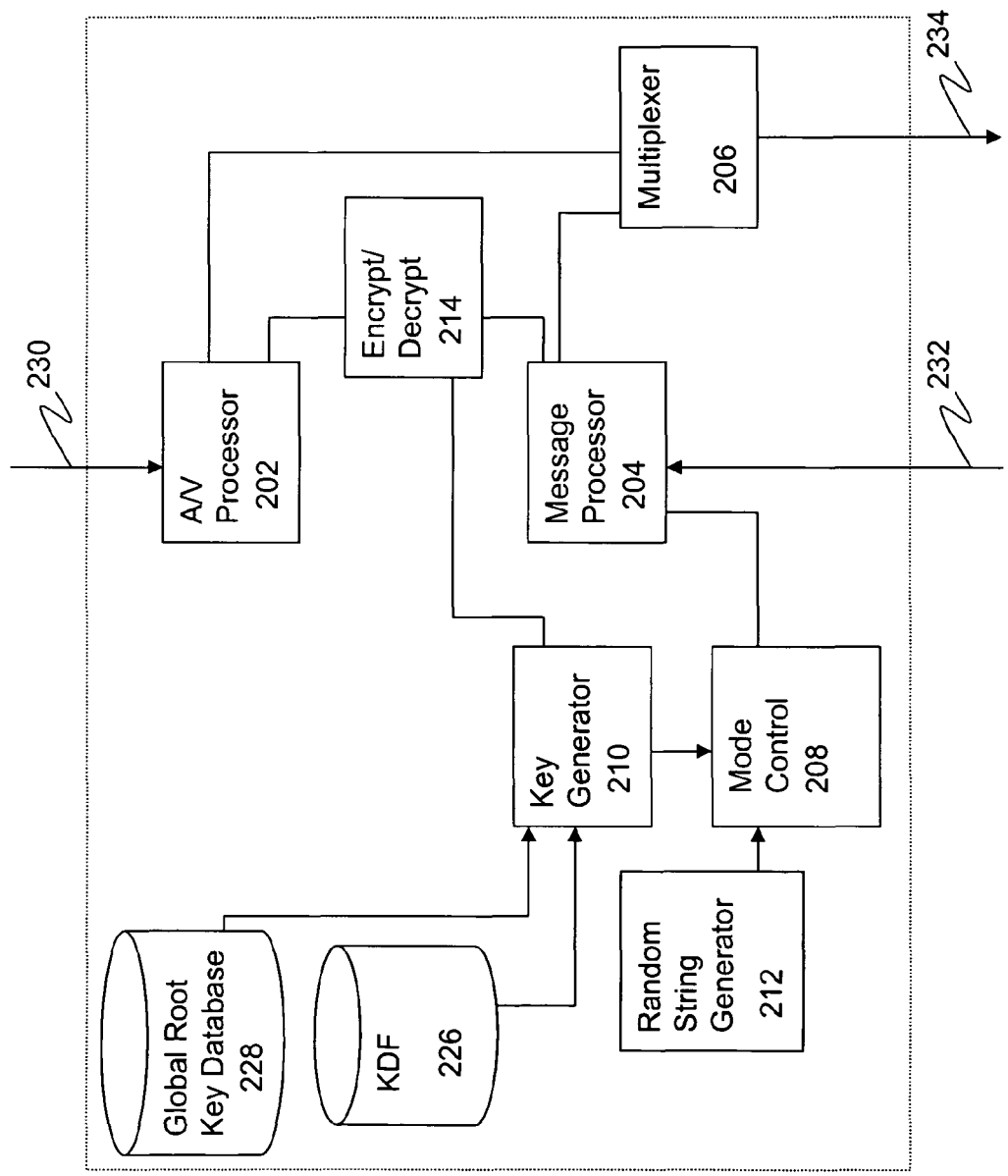
FIG. 2 illustrates a media distribution center, according to an embodiment of the present invention.

FIG. 2 illustrates a media distribution center, such as headend 110, according to an embodiment of the present invention. Headend 110 can include an audio/video processor 202, a message processor 204, a multiplexer 206, a headend mode controller 208, a headend key generator 210, a random value generator 212, an encrypter/decrypter 214, a headend key derivation function device 226, and a headend global root key database 228. Headend 110 can have an input interface 230 that couples headend 110 to various audio/video programming content sources, and one or more input interfaces 232 that, for example, couple headend 110 to controlled devices in media distribution system 100 as well as various sources of programming content. An interface 234 couples headend 110 to media distribution network 111. A person of ordinary skill in the art will understand that headend 110 can include various other devices including, for example, processors, storage devices, recording devices, etc.

Audio/video processor 202 can include one or more audio/video content processing devices. Audio/video processor 202 includes the functionality to receive and descramble/decrypt audio and video content from various content generation sources and process such input into programming content, and the functionality to encrypt programming content for delivery over media distribution network 111. For example, audio/video processor 202 can include functionality to insert advertising content into the stream of programming content, to perform any content format changes and/or compression, and to encrypt the content before the programming content is transmitted out to media distribution network 111.

Message processor 204 can include one or more message processing devices. Message processor 204 includes the functionality to receive and respond to messages from controlled devices, to generate messages in response to instructions from headend mode controller 208. Messages from controlled devices can include requests for conditional access keys and status messages. Headend mode controller 208 can direct message processor 208 to generate messages to be transmitted to one or more controlled devices to effect a change of conditional access modes.

Multiplexer 206 includes the functionality to combine the stream of programming content and control messages into a form that can be transmitted over interface 234 into media distribution network 111. Multiplexer 206 can implement one or more multiplexing methods such as inserting messages to be transmitted in selected locations in an audio/video programming stream, based on characteristics including characteristics of media distribution network 111.

Headend mode controller 208 includes the functionality to cause one or more controlled devices to change their conditional access modes in response to messages from headend 110. In one embodiment, headend mode controller 208 generates one or more messages, such as, a mode request message, a mode authorization message, and a key distribution message, that is to be transmitted to an identified controlled device. The keys to be transmitted, and the keys needed for encryption etc., can be generated using headend key generator 210, and random values used for message authentication can be generated using random value generator 212.

Headend key generator 210 can include functionality to, for example, derive a root key (also referred to herein as KEY-2) specific to a given conditional access provider using a global root key and a key derivation function. Headend key generator 210 can also include functionality to generate keys with various predetermined characteristics. The encryption key (also referred to herein as secret key or KEY-3), for example, can be generated in headend key generator 210 using a random key generator with predetermined cryptographic characteristics. Key generators are generally well known in the relevant arts.

Random value generator 212 can provide a random value, such as a random integer in a specified range or a random string with specified characteristics, to be used in messages transmitted to a controlled device to aid that controlled device in authenticating the messages. Random value generators are generally well known in the art.

Encrypter/decrypter 214 can include one or more devices that provide the ability to scramble/descramble and/or encrypt/decrypt various messages and content. In one embodiment, encrypter/decrypter 214 can encrypt the stream of audio and video programming content to be transmitted out. The functionality to decode or decrypt the incoming content from various content providers can also be provided by encrypter/decrypter 214. Also, encrypter/decrypter 214 can provide encryption for messages that are transmitted to controlled devices, and for any messages that are received at headend 110. Encryption and decryption technology that can be used in encrypter/decrypter 214 are generally well known, and can include one or more of Data Encryption Standard (DES), Triple-DES (TDES), and Advanced Encryption Standard (AES). In some embodiments, encrypter/decrypter 214 can receive keys used for encryption and/or decryption from headend key generator 210.

Headend global root key database 228 includes global root keys for controlled devices, including those controlled devices that are currently connected to media distribution network 111. Headend global root key database 228 can either be located physically within headend 110, or be located remotely such that it can be accessed securely by headend 110. Headend global root key database 228 can be any data store that includes one or more global root keys. Global root keys can be generated by a conditional access provider or a higher conditional access authority or a key generating entity. Typically, each controlled device is assigned a unique global root key. The global root key for a controlled device can be considered a shared secret, i.e., a secret shared between one or more conditional access providers. For example, a global root key that is unique to STB 120 can be generated by inputting the serial number of STB 120 to a one-way hash function. The global root key for a controlled device is shared among all conditional access providers and/or media distribution centers that are coupled to, or that can be potentially coupled to, that controlled device. Note that herein the term "database" is used to refer to a collection of data items and does not necessarily imply a database management system.

Headend key derivation function module 226 includes key derivation functions that are used in the derivation of the root key that is specific to each conditional access provider. In one embodiment, headend key derivation function module 226 includes at least one key derivation function from each conditional access provider that can service the media distribution system 100. A key derivation function, as used herein, is a cryptographic hash function that takes as input a non-secret value or a shared secret value such as a global root key and produces a key that is specific to the conditional access provider to whom the key derivation function is assigned. Key derivation functions can have predetermined characteristics such that keys output from these key derivation functions include specified levels of cryptographic "strength" or other features. In general, embodiments of the present invention can utilize any secret key derivation functions. A secret one-way key derivation function can be used in some embodiments.

A Controlled Device

Figure 3:
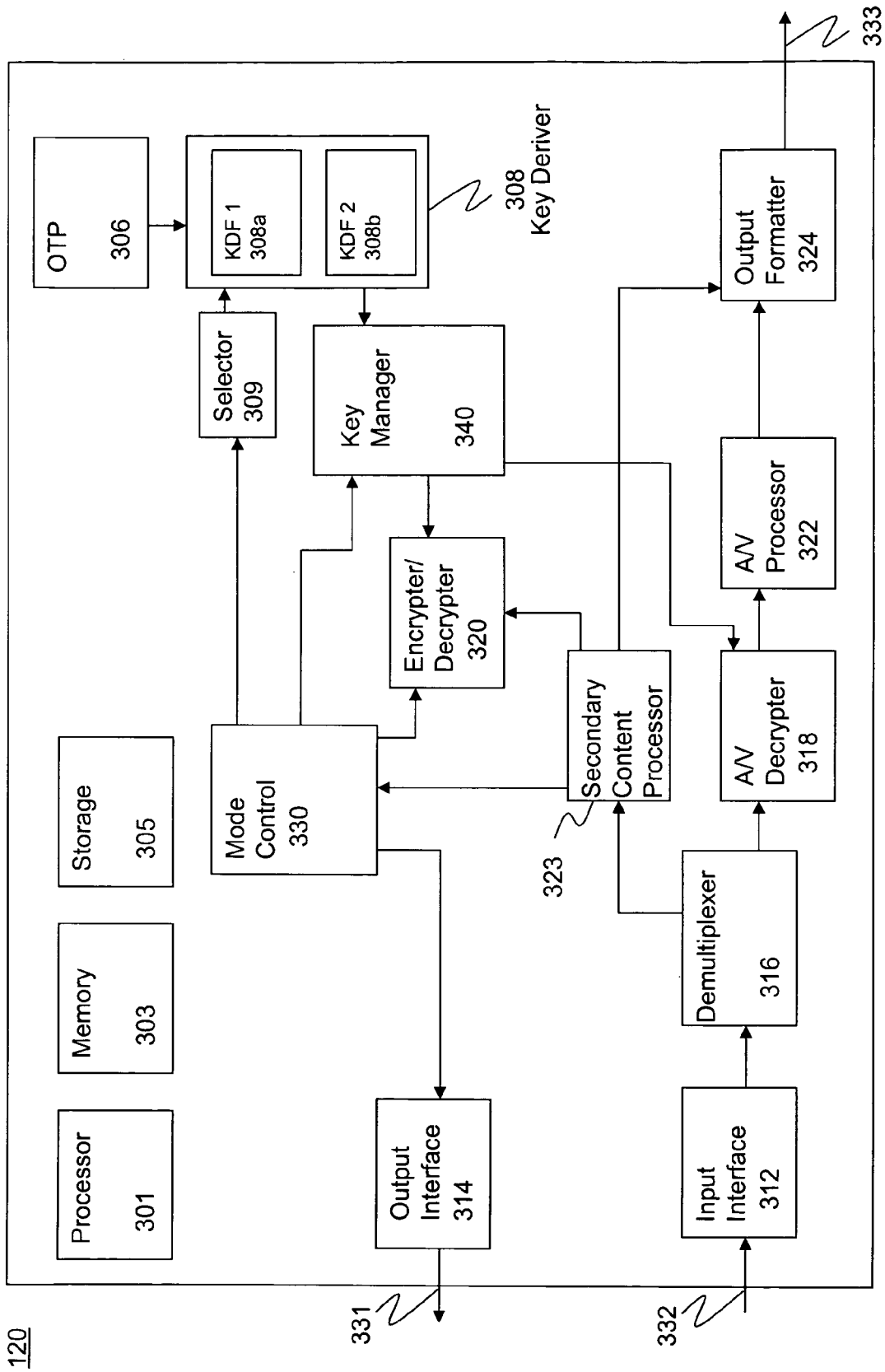
FIG. 3 illustrates a controlled device, according to an embodiment of the present invention.

FIG. 3 illustrates a controlled device, such as STB 120, that is coupled to a media distribution system such as media distribution system 100. In one embodiment, STB 120 includes a processor 301, memory 303, storage 305, one time programmable (OTP) memory 306, a STB key deriver 308, a key derivation function selector 309, an input interface 312, an output interface 314, a demultiplexer 316, an audio/video decoder 318, an encrypter/decrypter 320, an audio/video processor 322, a secondary content processor 323, an output formatter 324, an STB mode controller 330, and an STB key manager 340. STB 120 can include input interface 312 for receiving input, such as programming content and control messages, from headend 110. STB 120 can also include output interface 331 that can be used for transmitting status and other messages to headend 110, and an interface 333 to a transmit programming content to a receiver such as receiver 130. Persons ordinarily skilled in the art would recognize that STB 120 can contain processing and communicating components (both hardware and software) other that those shown in FIG. 3. It should be noted that in one embodiment, the STB 120 can represent a system-on-a-chip implementation of a set-top box.

Processor 301 can include one or more control processors such as central processor units (CPU), graphic processor units (GPU), digital signal processors (DSP), field programmable gate arrays (FPGA), or application specific integrated circuits (ASIC). Processor 301 (e.g., the one or more processors comprising processor 301) can include the functionality to control the functions of components of STB 120, and to implement logic, logic blocks, and software modules within STB 120.

Memory 303 can include dynamic or volatile memory such as random access memory (RAM). Memory 303 is typically used for holding data, processing logic, and results during processing. In some embodiments memory 303 can also be used for storing keys and related data.

Storage 305 can include persistent (non-volatile) memory devices and/or persistent data storage devices such as disk storage, flash memory, etc. Among its many uses, storage 305 can be used to store keys and related information.

OTP memory 306, in general, includes a non-volatile memory such as a programmable read only memory (PROM). OTP includes the functionality to hold information such as configuration data such as global root keys, authorized mode values, etc. In one embodiment, for example, the global root key corresponding to the STB can be stored in OTP memory 306 at the time of manufacture.

STB key deriver 308 includes one or more key derivation functions (e.g., key derivation function 1 308a and key derivation function 2 308b). In one embodiment, STB key deriver 308 includes a separate key derivation function for each of several conditional access providers. For example, at the time of manufacture, each conditional access provider can provide a logic block, hardware circuit, and/or software algorithm implementing its key derivation function, to be integrated into STB 120. Typically, conditional access providers would each distribute the key derivation function and related hardware and/or software implementing its key derivation functions in a manner that substantially maintains the secrecy of those functions. In an embodiment, based on the requested conditional access mode, headend 110 dynamically selects a key derivation function. Likewise, STB 120 can use selector 309 to select a key derivation from the STB key deriver 308 based on the conditional access mode. In an embodiment, selector 309 can be a switch implemented in hardware that can dynamically select a key derivation function. For example, based on the requested mode, selector 309 can be switched to enable the key derivation function for the conditional access provider corresponding to that requested mode.

Note that with respect to a particular conditional access provider, its key derivation function in the headend should correspond to its key derivation function in the STB. For example, the functional relationship between a particular conditional access provider's key derivation functions in the headend and in an STB should be such that the root key KEY-2 derived at the STB must be usable to decrypt messages encrypted with the root key KEY-2 derived at the headend. In one embodiment, for a particular conditional access provider, the key derivation functions in the headend and STB are identical, and therefore the root keys produced by inputting the same global root key to the key derivation functions are identical. The use of identical keys for encryption and decryption is also referred to as symmetric key encryption.

In one embodiment, a global root key retrieved from OTP 306 is input to a selected key derivation function in STB key deriver 308 to derive a root key specific to a conditional access provider. STB key manager 310 can include the functionality of a key ladder, where keys are derived or recovered at each level based on another (e.g., previously determined) key. For example, in one embodiment, STB manager 340 can implement a key ladder of two levels: a first level in which a conditional access provider-specific root key KEY-2 is obtained, and a second level in which the root key KEY-2 is used in the recovery of an encryption/decryption key from a message sent by a headend.

Input interface 312 includes functionality to receive programming content and messages from a network, for example, media distribution network 111 through interface 332. Output interface 314 includes the functionality to output messages and other data, for example, to headend 110 through interface 331 and media distribution network 111. In addition to electrical components, input interface 312 and output interface 314 can also include logic implementing of one or more protocols to receive programming content and to exchange messages with headend 110. For example, input interface 312 and output interface 314 can implement a version of the DOCSIS protocol standard, or the DVB-CA protocol standard, in collaboration with its counterpart interfaces in headend 110. Input interface 312 and output interface 314 can be implemented using well known interface technology.

Demultiplexer 316 receives the incoming data stream from input interface 312, and demultiplexes the data stream into audio/video programming stream and messages and/or other content. Demultiplexer technology is well known in the relevant arts. The audio/video programming content is input to audio/video decrypter 318 and the messages and other content are directed to secondary content processor 323. Secondary content processor 323 can use encrypter/decrypter 320 to decrypt any encrypted messages. In one embodiment EMM messages, such as encrypted mode authorization messages, can be passed by secondary content processor 323 to STB mode controller 330. Both devices 318 and 320 include functionality to decrypt the incoming streams using one or more of decryption methods. In one embodiment, devices 318 and 320 will be provided with decryption keys by STB key manager module 340. For example, in one embodiment, key manager 340 periodically receives encrypted code words (keys) with which incoming programming are encrypted. Based on the currently authorized conditional access mode, key manager 340 may decrypt the code words and provide the decrypted code words to audio/video decrypter 318 to decrypt incoming programming content.

STB mode controller 330 includes functionality to receive incoming mode control messages, for example, mode requests, key messages, and mode authorization messages from headend 110, and implement the appropriate mode changes. STB mode controller can decrypt the messages as necessary by using encrypter/decrypter 320, either directly or through STB key manager 340. In one embodiment, STM mode controller 330 implements process 800 and/or process 900 (described below) to change the mode of the STB 120.

Audio/video processor 322 includes the functionality to perform various processing on the programming content received from decrypter 318, including content filtering, encoding for transmission over interface 333, compression, etc. Secondary content processor 323, in one embodiment, includes the functionality to process messages and/or other content such as sub-titles and other text overlays on a video stream. The audio/video programming content from audio/video processor 322 and other content from secondary content processor, are then received at output formatter 324 that includes the functionality to perform processing and formatting specific to interface 333 and/or the receiving device, such as receiver 130. Output formatter 324 can output the content to interface 333.

Controller for Authenticated Mode Control

Figure 4:
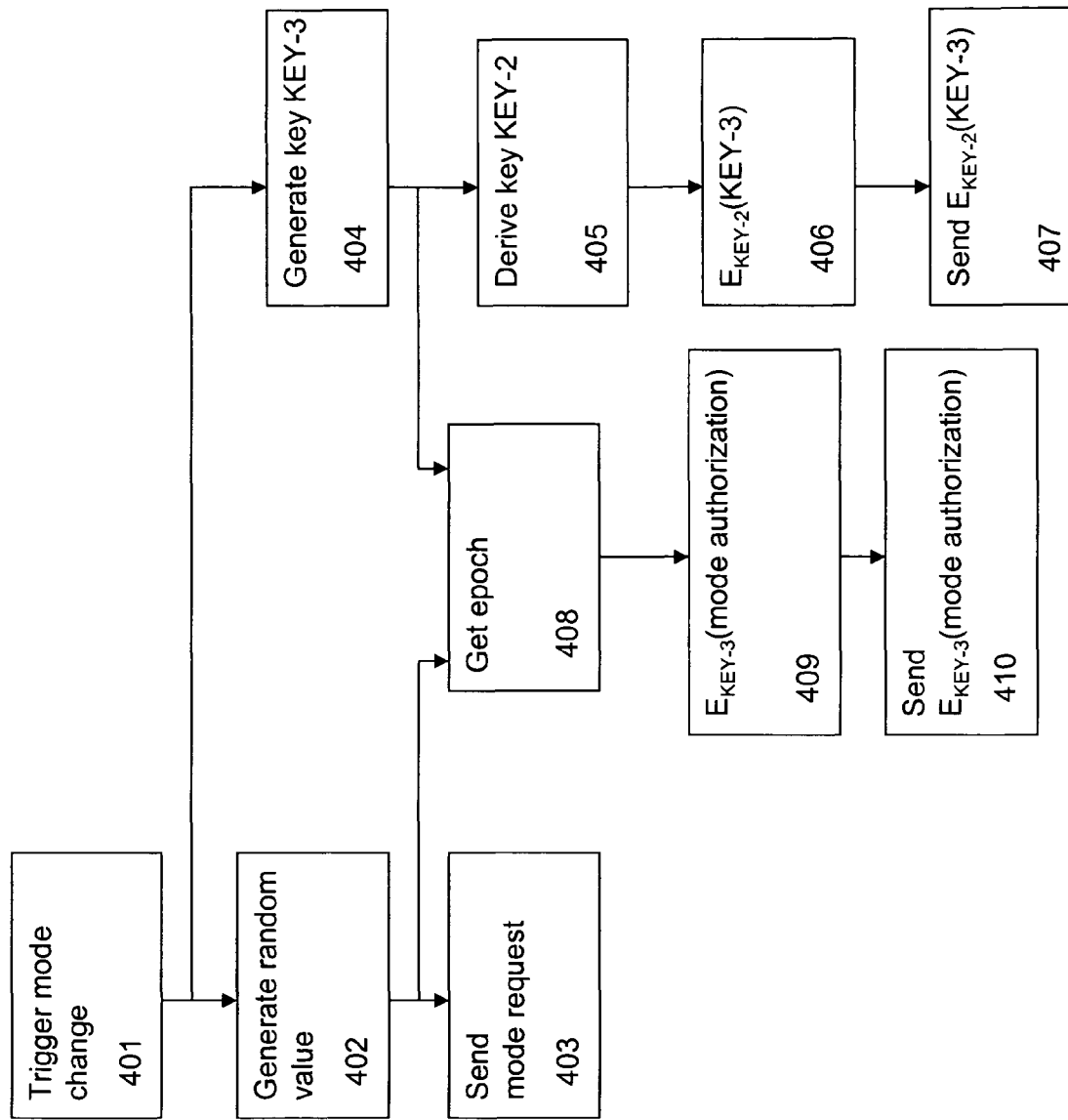
FIG. 4 illustrates a method for causing a change of conditional access modes in controlled devices as implemented at a headend, according to an embodiment of the present invention.

FIG. 4 illustrates a process 400 that can be implemented in a media distribution center, such as headend 110, to cause one or more controlled devices, such as STB 120, to perform a controlled change of operating modes. The change of operating mode can be the changing of conditional access modes. For example, headend 110 may cause STB 120 to transition from a mode where STB 120 has no active conditional access provider (MODE-0) to a mode where conditional access provider B (i.e., CA-B) is the active conditional access provider (MODE-B). In the embodiments described in relation to process 400, headend 110 generates three messages—a key message (MKEY), a mode authorization message (MAUTHORIZATION), and a mode request message (MREQUEST)—to cause the change of mode at STB 120 from MODE-0 to MODE-B. A corresponding process in STB 120 is described with respect to FIG. 6. Further description of a state machine that can be implemented in STB 120 corresponding to the embodiments described here is available in relation to FIG. 8.

Although process 400 is described herein with a particular ordering of processing steps 401-410, it should be noted that different ordering of steps, the deletion or addition of certain steps, and changing the functionality of one or more steps, are possible while being consistent with the teachings in this disclosure. Also, although the embodiments primarily describe three separate messages that cause the change of mode, other embodiments of the present invention can include different means by which STB 120 is informed of the necessary instructions and authorizations to change its conditional access mode. For example, in some embodiments, the content of one or more of the messages MKEY, MAUTHORIZATION, and MREQUEST, can be available to STB 120 through other means such as OTP where the information is stored at the time of manufacture or initialization of the STB 120, or when a related message is received from headend 110.

In step 401, headend 110 initiates one or more processes that control the change of conditional access modes in STB 120. Headend 110 may initiate the one or more processes in response to a received alert that indicates the need to have STB 120 effect a change of conditional access modes. A received alert can, for example, include a message from the STB 120 indicating that it has newly connected to media distribution network 111, an explicit instruction generated by a user (e.g., an operator from the service provider or conditional access provider), or a switch of conditional access providers in media distribution network 111.

In step 402, headend 110 generates a random value that can subsequently be included in messages to STB 120 to aid in the authentication of those messages. In one embodiment, the random value is a random integer in a predetermined range. In another embodiment, a random string value of a predetermined length can be generated. The random value generation may be implemented in random string generator module 212 in headend 110. Methods for generating random numbers and/or random strings according to various security criteria are well known in the relevant arts. It should be noted that some embodiments of the present invention may not include a step 402 and/or the generation of a random value, and may use another method to authenticate the messages. For example, in some embodiments no additional verification may be required of messages due to characteristics of the message delivery facilities in the corresponding system, such as media distribution system 100. Additional message level verification and/or authentication using message content may not be needed if, for example, the underlying communication network, such as media distribution network 111, provides a highly reliable message delivery platform that can substantially ensure that no attacker can insert malicious messages that masquerade as one or more of MKEY, MAUTHORIZATION, and MREQUEST messages from the headend 110 to STB 120.

In step 403, a mode request message MREQUEST is generated and transmitted to one or more controlled devices including STB 120. MREQUEST includes the desired conditional access mode (requested-mode) and is generally transmitted to STB 120 in unencrypted form. MREQUEST also includes the random value generated in step 402 to aid in authentication. MREQUEST can be generated in one or more of the modules 204 and 208, and be transmitted to STB 120 via interface 234 from headend 110.

In step 404, an encryption key (KEY-3) is generated with which to subsequently encrypt the outgoing mode authorization message MAUTHORIZATION. Embodiments described in relation to process 400 utilize a key ladder of two levels, i.e., a conditional access provider-specific root key derived from a global root key, and a key used to encrypt/decrypt the mode authorization message. Other embodiments may include key ladders having different numbers of levels. The key KEY-3 with which to encrypt the mode authorization message can be generated by a random key generator. For example, in one embodiment, key generator 210 of headend 110 may include a random key generator. Random key generators that generate keys according to various specified cryptographic properties are well known in the relevant arts.

In step 405 a root key is derived. The root key KEY-2 derived in step 404 can be used as the initial key in a key ladder utilized by headend 110 and STB 120 for purposes including the changing of conditional access modes. In some embodiments, step 405 can be implemented in a module such as key generator module 210 of headend 110. The derivation of KEY-2 by headend 110 is described in relation to FIG. 5 below.

In step 406, key distribution message MKEY to distribute KEY-3 is generated and encrypted with conditional access provider-specific root key KEY-2. MKEY includes KEY-3 in encrypted form. In some embodiments, message processor 204 may utilize encrypter/decrypter module 214 to encrypt the contents of MKEY including KEY-3. The intended purpose of MKEY is to inform a controlled device such as STB 120, of the key with which the mode authorization message is encrypted by headend 110. Therefore, some embodiments in which STB 120 can be informed of the encryption key KEY-3 for encrypting the mode authorization message through other means may not include a separate MKEY message. For example, in embodiments that use the root key KEY-2 to encrypt the mode authorization message, no separate MKEY message is needed because KEY-2 can be derived by the STB 120 without a separate message from headend 110.

In step 407, the MKEY message is transmitted to STB 120 through, for example, interface 234 and media distribution network 111.

In step 408, headend 110 can obtain a value associated with the conditional access provider corresponding to the requested-mode, such as an epoch value. An epoch value can be used as an aid to verify the authentication of a message as well as a mechanism to revoke a previously configured conditional access mode. An epoch value herein can be regarded by STB 120 as a monotonically increasing positive integer value. Each time headend 110 causes a change to a requested-mode, headend 110 can increment the locally-maintained epoch value associated with the corresponding conditional access provider and/or key derivation function by one. Each time STB 120 changes to the requested-mode as authorized by headend 110, STB 120 can increment the locally-maintained epoch value associated with the corresponding conditional access provider and/or key derivation function by one. In one embodiment, when headend 110 determines that the current mode of STB 120 should be revoked, headend 110 would request STB 120 to write an epoch value higher than a predetermined threshold into its OTP memory. This would effectively revoke previously received mode authorization messages because previously received mode authorization messages would have a lower epoch value. Thereafter, headend 110 would ensure that the messages it sends have an epoch value equal to or greater than the one in STB 120.

A mode authorization message MAUTHORIZATION is generated in step 409. MAUTHORIZATION includes the conditional access mode for which authorization is granted. Some or all of the contents of the MAUTHORIZATION message are encrypted. MAUTHORIZATION can also include other items such as the random value generated in step 402, and the epoch value obtained in step 408. For example, transmitting the random value generated in step 408 in encrypted form would enable STB 120 to compare the random string from MREQUEST and MAUTHORIZATION and determine the authenticity of MREQUEST with substantial certainty. An added level of verification can be obtained with the epoch value included in the MAUTHORIZATION. Also, the epoch value can be used as a mechanism with which to affect a revocation of a conditional access mode in STB 120. The generation and encryption of the MAUTHORIZATION message can be implemented, for example, in message processor 204 and encrypter/decrypter 214 of headend 110.

In step 410, the encrypted MAUTHORIZATION message is transmitted to STB 120 through, for example, interface 234 and network 111.

Figure 5:
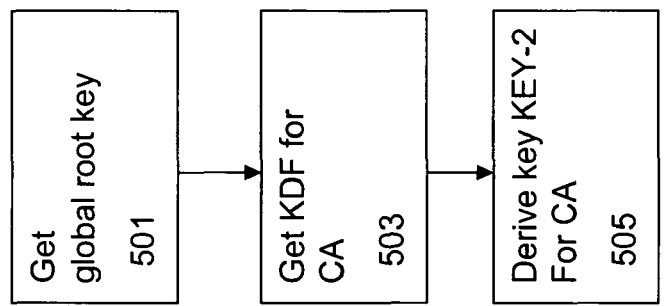
FIG. 5 illustrates a method for deriving a root key at a headend, according to an embodiment of the present invention.

FIG. 5 illustrates the processing of step 405 in more detail. The manner in which the root key is derived in embodiments of the present invention, enables changing of conditional access modes in controlled devices without revealing the root keys and/or encryption keys of one conditional access provider to another.

As described above, a shared global root key is made available to conditional access providers that desire the capability to change conditional access modes of controlled devices in their associated service provider networks. The shared global root key can be unique to each controlled device. The global root keys can be generated and distributed to conditional access providers by a higher level conditional access authority. In one embodiment, a database of all shared global root keys is made accessible to headend 110, where the database includes the global root key for all controlled devices that have been configured with the key derivation functions of any one of the conditional access providers that provide services over the corresponding network.

In step 501, headend 110 or more particularly key generator 210, can access global root database 228. Using an identifier for STB 120 and in some cases also the conditional access provider corresponding to the requested-mode, headend 110 can determine the global root key corresponding to STB 120.

The global root key for STB 120 is then provided as input to a key derivation function assigned to the conditional access provider corresponding to the requested-mode. Key derivation functions for each of the potential conditional access providers can be made available in headend key derivation function module 226. Note that embodiments of the present invention can include key derivation functions in the headend implemented in hardware, software, or any combination thereof. Key derivation functions, as described above, are unique to each conditional access provider. Embodiments of the present invention may utilize a variety of key derivation functions, where the key derivation functions are secret to each conditional access provider. Key derivation functions that are secret one-way functions may provide for stronger authentication capabilities.

In step 505, the root key is obtained; for example, as the output from the key derivation function selected in step 503. The root key, KEY-2, is unique to the conditional access provider to whom the key generation function was assigned. By having a shared global root key and a secret key derivation function for each conditional access provider, embodiments of the present invention avoids the necessity to share the encryption themselves between conditional access providers.

Controlled Device Implementing Authenticated Mode Control

Figure 6:
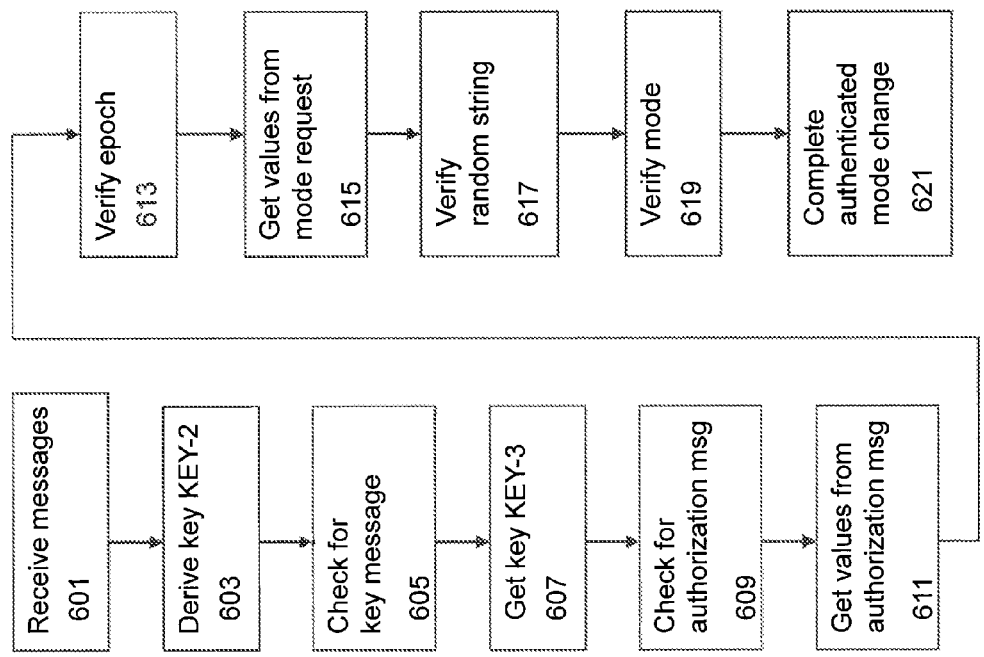
FIG. 6 illustrates a method for causing a change of conditional access modes in controlled devices as implemented in a controlled device, according to an embodiment of the present invention.

FIG. 6 illustrates a process 600 that can be implemented on a controlled device such as STB 120 to receive and process messages from a headend, such as headend 110, to cause the controlled device to change its mode of operation. For example, process 600 can be used to transition STB 120 from a mode of receiving content from conditional access provider A (MODE-A) to a mode of receiving content from conditional access provider B (MODE-B).

In step 601, a plurality of messages pertaining to a change of mode to be effected is received in STB 120. In one embodiment, three messages are received at STB 120 from headend 110 over the media distribution network 111 and input interface 322. The three messages—MKEY, MAUTHORIZATION, and MREQUEST—can be received at STB 120 in any order. The received messages may be stored in a temporary memory, such as memory 303, in STB 120 at least until they are processed, for example, according to steps 603-621. The received messages may also be stored in non-volatile memory such as flash memory so that the last received mode-related messages are available for use even in the event of a reboot of the STB.

MKEY is a message from headend 110 to STB 120 that informs STB 120 of the key KEY-3 used for protecting the mode authorization message MAUTHORIZATION. MAUTHORIZATION includes an authorized mode and a random string. In some embodiments, MAUTHORIZATION can also include an epoch value. MAUTHORIZATION is generally generated by a headend corresponding to the particular STB and conditional access provider, such as headend 110. MREQUEST is the message requesting a change of mode. In the embodiment described herein, MKEY, MAUTHORIZATION, and MREQUEST, are all generated at the same headend. However, there can be other embodiments of the present invention in which MKEY, MAUTHORIZATION, and MREQUEST, are not generated at the same location. Example embodiments include embodiments in which one or more MREQUEST and MAUTHORIZATION messages are stored in OTP memory of STB 120 at the time of manufacture In step 603, the root key of a key ladder used for key management in STB 120 can be derived. In one embodiment, a global root key that may be shared among a plurality of conditional access providers is input to a key distribution function specific to the conditional access provider corresponding to the requested mode. The output from the key derivation function is a key KEY-2 that corresponds to the root key of the key ladder that can be used to access messages from headend 110 with respect to the new conditional access provider. Step 603 is further described below in relation to FIG. 7. The derivation of the root key KEY-2 can be implemented by modules including the STB key generator module 310 and the STB key deriver 308 of STB 120.

In step 605, STB 120 obtains a MKEY message. STB 120 can obtain the messages for performing the change in conditional access modes. In some embodiments, the messages may already be received and stored in a temporary memory such as memory 303 or a more permanent form of storage such as OTP 306 or storage 305. In some embodiments, step 605 may include a request/response message exchange for STB 120 to request the MKEY message from headend 110.

The MKEY message is, received in general, in encrypted form. In the MKEY message, the encryption key KEY-3 would have been encrypted using the root key KEY-2 at the sender. In step 607, the MKEY message is decrypted to obtain the key KEY-3. The recovery of key KEY-3 from the message MKEY may be performed by key manager module 340 and the encrypter/decrypter module 320.

A mode authorization message MAUTHORIZATION that corresponds to the MKEY message received in step 605 is obtained in step 609. The MAUTHORIZATION message may have been previously received and stored in a temporary memory such as memory 303 or a more permanent form of storage such as OTP 306 or storage 305. In some embodiments, step 605 may include a request/response message exchange for STB 120 to request the MAUTHORIZATION message from headend 110.

The MAUTHORIZATION message is, in general, encrypted by the sender using the encryption key KEY-3. In step 611, the MAUTHORIZATION message is decrypted using the key KEY-3 obtained in step 607. In one embodiment, the decrypted MAUTHORIZATION message includes the value of the authorized-mode for STB 120, a random value generated at the headend 110 which is also included in the corresponding mode request message MREQUEST, and an epoch value.

In step 613, the epoch value is compared to a corresponding epoch value maintained in STB 120. In some embodiments, headend 110 can signal a revocation of the currently authorized-mode by instructing STB 120 to increase its epoch value. A revocation is intended, in general, to cause STB 120 to transition into a mode where it is not authorized to receive programming content from any conditional access provider. For example, headend 110 can request STB 120 to increase its locally maintained epoch value, thereby preventing any previously received mode authorization messages from being effective.

If the epoch value in MAUTHORIZATION is greater or equal to the epoch stored in STB 120, then the epoch values are considered valid.

In step 615, a corresponding request message MREQUEST is received. In some embodiments, the MREQUEST message may have been previously received and stored in a temporary memory such as memory 303 or a more permanent form of storage such as OTP 306 or storage 305. In some embodiments, step 605 may include a request/response message exchange for STB 120 to request the MREQUEST message from headend 110. The mode request is typically transmitted by the headend 110 in the clear, i.e., without encryption. In step 615, the data items from the MREQUEST message are obtained. For example, the MREQUEST message contains a requested-mode as well as, in some embodiments, a random value that is also included in the corresponding MAUTHORIZATION message.

In step 617, the random values from the MREQUEST message and the MAUTHORIZATION messages are compared. If the random values do not match, there can be no transition. If the random values match, then the MREQUEST and MAUTHORIZATION have been verified. For example, the matching of the random strings enables the use of the MAUTHORIZATION message that was sent in encrypted form, to authenticate the MREQUEST message that was sent in non-encrypted form.

In step 619, having successfully verified the epoch, if any, and having verified the random values such as random strings embedded in MREQUEST and MAUTHORIZATION messages, the requested-mode from MREQUEST is compared with the authorized-mode from MAUTHORIZATION. If the requested-mode and the authorized-mode match, then a request for a change of conditional access modes has been verified and authorized.

In step 621, the STB 120 changes its conditional access mode as specified in MREQUEST. Further description of implementing the change of conditional access modes in STB 120 is provided with respect to FIGS. 8 and 9.

Figure 7:
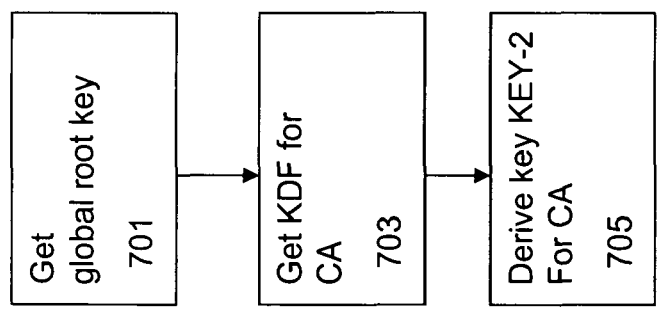
FIG. 7 illustrates a method for deriving a root key at a controlled device, according to an embodiment of the present invention.

FIG. 7 illustrates the processing involved in deriving the root key KEY-2 in step 603, according to one embodiment. In step 701, STB 120 obtains its global root key. As described previously, STB 120 can have its global root key stored in a memory such as OTP memory 306. In some embodiments, the global root key is stored at the time of manufacture, for example, by using a black box key database in the assembly line. The black box key database can be provided by a conditional access provider or other key generating authority. In other embodiments, the global root key may be stored in STB 120 after the time of manufacture, by inserting a smart card or other pluggable device containing the global root key, or by downloading the global root key to the STB 120 via a secure distribution means such as secure software download.

In step 703, the key derivation function for the conditional access provider corresponding to the requested-mode is identified and selected. In one embodiment, the key derivation functions of each conditional access provider are implemented as separate logic blocks implemented in hardware, for example, in STB key deriver 308. Based on the requested mode, one of the key derivation function logic blocks are selected, for example, using selector 309. Key derivation functions and the implementation of key derivation functions are well known. Embodiments of the present invention can include a variety of key derivation functions. In some embodiments, the key derivation functions for one or more conditional access providers are secret one-way cryptographic functions.

In step 705, STB 120 inputs its global root key into the selected key derivation function for the requested mode. STB 120 receives the root key KEY-2 specific to the requested mode and corresponding conditional access provider as the output from the key derivation function. In one embodiment, for example, the root key is then used to decrypt the MKEY in order to extract key KEY-3.

Figure 8:
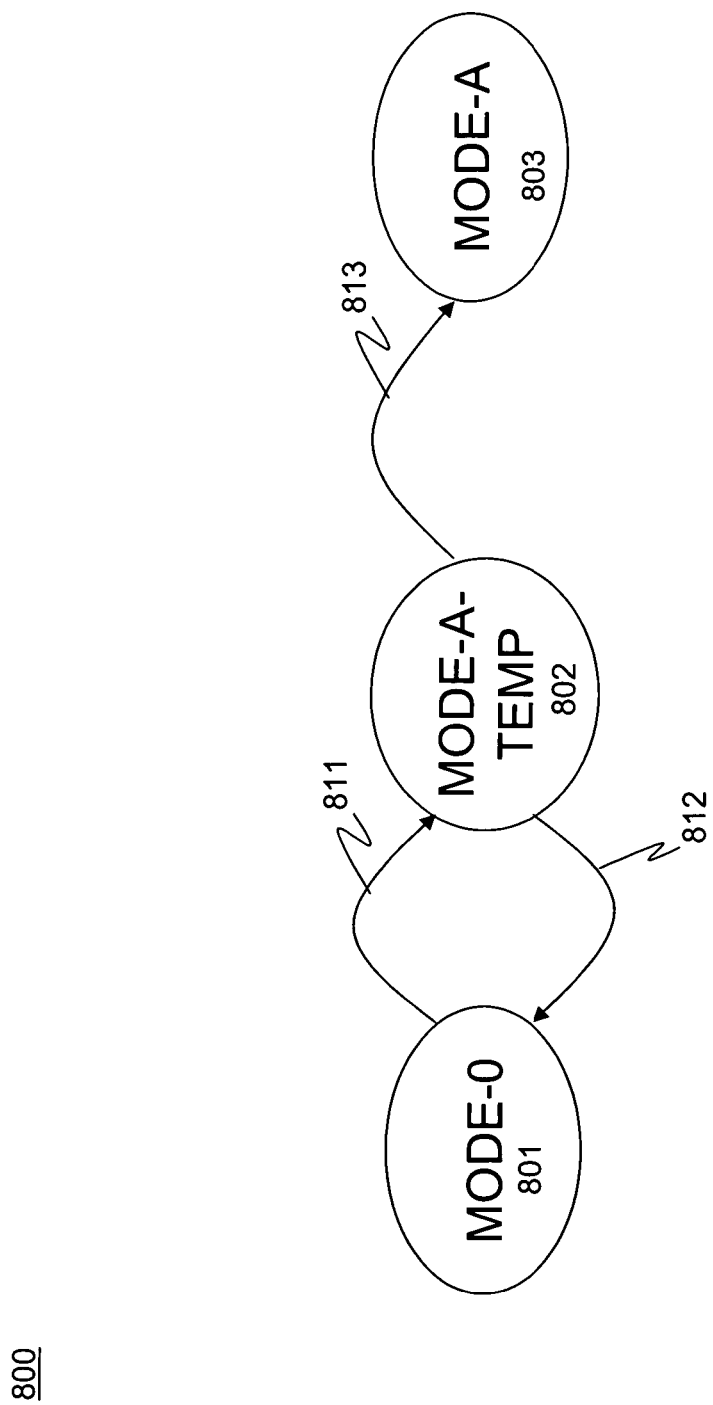
FIG. 8 illustrates a state machine implemented in a controlled device to change conditional access modes, according to an embodiment of the present invention.

FIG. 8 illustrates a state machine 800 that can be implemented in a controlled device, such as STB 120, according to an embodiment of the present invention. State machine 800 can be implemented in software, hardware, or using any combination thereof. State machine 800 can be used to ensure the controlled and authenticated changing of modes in STB 120. When STB 120 initially comes up (e.g., boots up), for example, when a new STB is installed in a network such as media distribution network 100, STB 120 comes up in mode MODE-0 801. In mode MODE-0 801, STB 120 is not authorized to receive conditional access protected content.

Transition 811 can be triggered upon STB 120 reading a mode request that requests a change of mode to MODE-A. As mentioned above, STB 120 may have access to a mode request in many ways. For example, a mode request may be received from a headend, such as headend 110, or another authorization entity coupled to the distribution network 100. A mode request may also be created at the time of manufacture and held in a memory, such as OTP memory. Also, in some embodiments a mode request may be generated by means local to STB 120, such as a software program triggered by a user or operator action.

Transition 811, causes STB 120 to transition from mode MODE-0 801 to mode MODE-A-TEMP 802, the unverified (or transitional) mode for conditional access provider A. In mode MODE-A-TEMP 802, STB 120 cannot receive conditional access protected content, but can receive messages from the conditional access provider corresponding to MODE-A, i.e., conditional access provider A (CA-A). In some embodiments, STB 120 can be prevented from receiving messages from any other conditional access provider than CA-A.

In mode MODE-A-TEMP 802, STB 120 is expecting to receive a mode authorization from the corresponding conditional access provider, i.e., CA-A. As noted above, mode authorization messages can be received from a headend, such as headend 110, in the form of EMM messages. When a mode authorization message is received it must be decrypted with a secret key that is generally received in a separate message from the headend. The separate message containing the secret key can be decrypted using another key which is specific to the corresponding conditional access provider. The decrypted mode authorization message generally contains the authorized-mode, and one or more other values such as a random number and an epoch.

The random number, for example, is generally used to verify that the mode authorization message and the mode request originate from the same source, for example, to reduce the possibility of a mode request inserted by an attacker having a negative effect on the network. The epoch can be used as a revocation mechanism, as described above. The random number of the mode authorization message is compared to the random number in the mode request message. If the match is exact, for example, the random number verification is completed successfully. The epoch received in the mode authorization message can be compared against the epoch held in memory of the STB. In general, it is expected that the epoch of the mode authorization message should be equal to or higher than the epoch value stored on the STB. Therefore, if the epoch value of the STB is equal or lower to the epoch value in the message, then the epoch values are considered verified.

If the verification of at least one of the elements to be verified—for example, mode value, random number, and epoch—is unsuccessful, then the verification can be considered failed, and transition 812 is invoked to transition the STB to mode MODE-0 801.

If the verification of all the relevant elements that were considered is successful, then the verification can be considered successful, and transition 813 can be invoked to transition STB 120 into a verified active mode, i.e., mode MODE-A 803. In mode MODE-A 803, STB 120 can receive conditional access protected content.

Figure 9:
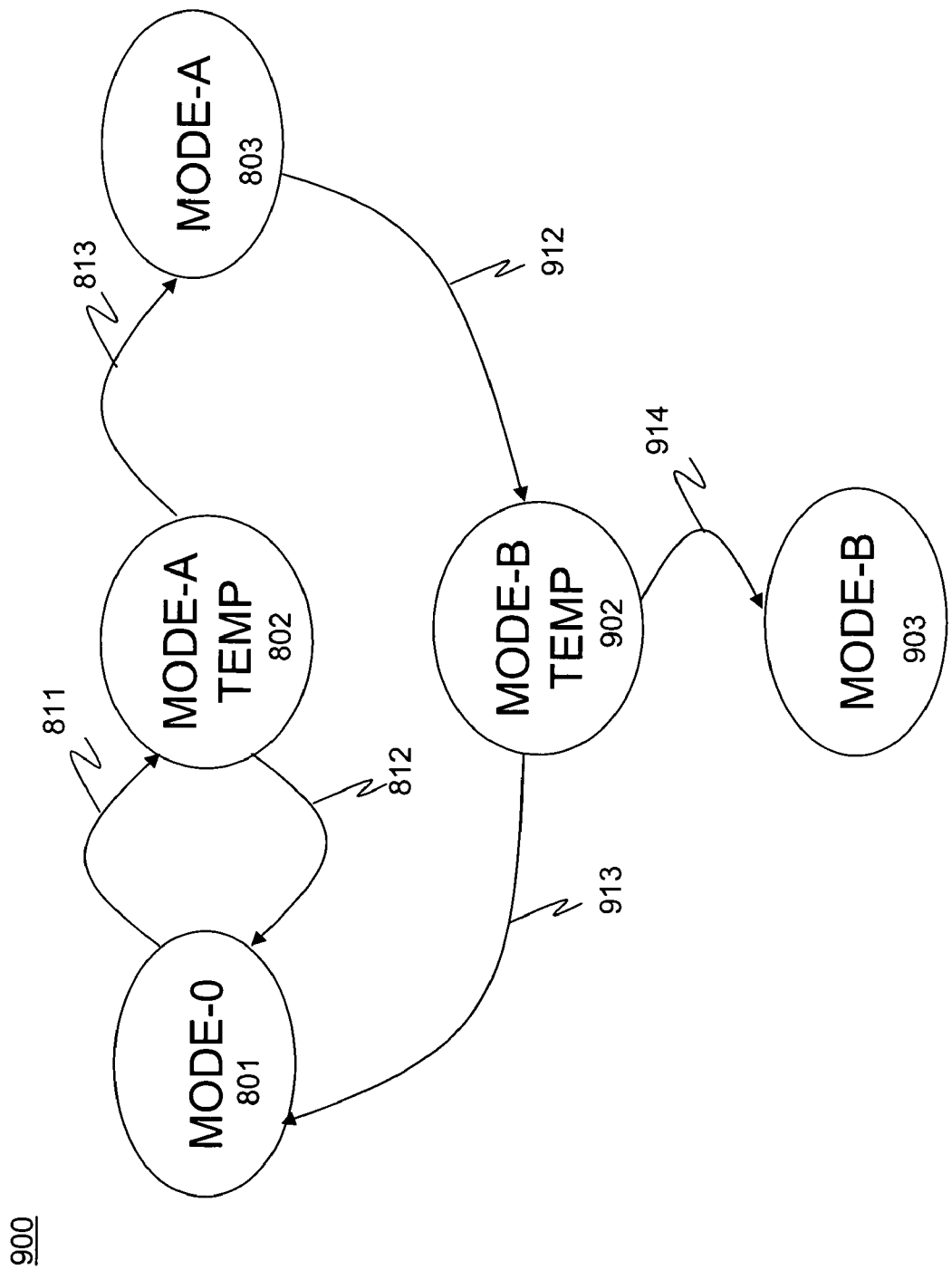
FIG. 9 illustrates another state machine implemented in a controlled device to change conditional access modes, according to an embodiment of the present invention.

FIG. 9 shows another embodiment of the present invention. State machine 900 illustrates, in addition to what is described with respect to FIG. 8 above, a means by which a controlled device such as STB 120 can transition from one active verified mode to another active verified mode.

As described earlier, STB 120 can transition to mode MODE-A 803 which is the active verified mode for conditional access provider A. If an event such as, changing the network coverage area of CA-B so that it now overlaps the network coverage area of CA-A at the location of STB-120, then STB 120 would require reconfiguration in order to receive content protected by conditional access provider B. Until such reconfiguration, STB 120 that was last in MODE-A is authorized only to receive content protected by conditional access provider A.

To initiate the transition, the current conditional access provider, e.g., CA-A, generates a mode request and mode authorization message authorizing CA-A to transition to the active mode for conditional access provider B, i.e., MODE-B. When the mode request from CA-A requesting a change to MODE-B, and also the mode authorization from CA-A authorizing the change to MODE-B, are received, STB 120 can move from mode MODE-A 803 through transition 912 to mode MODE-B-TEMP 902. Mode MODE-B-TEMP 902 is an unverified (or transitional) mode corresponding to conditional access provider B. In this state, STB 120 cannot receive content such as cable television programming content that is protected by conditional access provider B, but can receive messages.

In another embodiment, when STB 120 is in an active verified mode such as MODE-A, the current conditional access provider CA-A can send a mode request and corresponding mode authorization to the STB 120 to cause the STB to transition to a mode in which no conditional access provider, such as mode MODE-0 801. From mode MODE-0 801, STB 120 can transition to another active verified mode for any conditional access provider, as described above in relation to FIG. 8.

It should be noted here that embodiments of the present invention can prevent a controlled device from transitioning from one active verified mode to another active verified mode directly. Embodiments of the present invention also require that the corresponding conditional access provider (or another authorizing entity with authority to represent that conditional access provider) can authorize the transition into its active verified mode. For example, in the case of transitioning from mode MODE-A 803 to mode MODE-B 903, the intermediate unverified mode MODE-B-TEMP 902 can be made unavoidable. Also, compared to transitioning starting from a MODE-0 801 state, transitioning from an active mode such as MODE-A 803, requires a mode request and a mode authorization to transition to the unverified mode for the next conditional access provider.

While in mode MODE-B-TEMP 902, STB 120 can receive a mode request and a mode authorization from the new conditional access provider to which STB 120 is to transition to, conditional access provider B. STB 120 can maintain itself in mode MODE-B-TEMP 902 when the mode request from CA-B is received and it requests a transition to MODE-B. After the mode authorization message specifying MODE-B is received from CA-B and is decrypted, the mode request and mode authorization from CA-B can be verified in the same manner as other mode requests and corresponding mode authorizations are verified. If the verification is unsuccessful, STB 120 transitions through transition 113 to mode MODE-0 801. If the verification is successful, then STB 120 transitions to the active verified mode for conditional access provider B, MODE-B. In MODE-B, STB 120 has the capability to receive conditional access protected content from conditional access provider B.

State machine 900 is an example state machine that can be implemented in STB 120, in one embodiment of the present invention, to facilitate "chaining" of modes or conditional access providers that control STB 120. Chaining refers to having the control of STB 120 (for the provision of conditional access services) pass from one conditional access provider to another. For example, STB 120 that is initially in media distribution network 100 and in MODE-A can, at some stage, be moved to media distribution network 150. In one embodiment, prior to disconnection from media distribution network 100 STB 120 can receive mode request and mode authorization messages from CA-A requesting a change to MODE-B. The request and authorization from conditional access provider A, if verified successfully, causes STB 120 to transition into unverified MODE-B-TEMP. When it is moved to the media distribution network 150 and attached, STB 120 may receive mode request and mode authorization messages from CA-B requesting and authorizing the change to MODE-B. In another embodiment, STB 120 in MODE-A can, upon being coupled to a new media distribution system such as media distribution network 150, request CA-A to send the mode request and mode authorization messages that will enable STB 120 to transition to a mode in which the corresponding mode request and mode authorization from CA-B can be processed.

FIGS. 8-9 describe state machines in STB 120 that can implement the teachings of this disclosure in some embodiments. A person of ordinary skill in the art would recognize that other embodiments of the present invention may include modifications to state machines 800 and 900, and/or other state machines.

Other Embodiments

The embodiments described above are primarily those in which each controlled device is assigned a unique global root key. Another embodiment of the present invention includes a global root key or root key KEY-2 that is common to multiple controlled devices of a particular conditional access provider. Note that a global root key that is common to multiple controlled devices of a conditional access provider would result in a common root key KEY-2 if the conditional access provider maintains the same key derivation function for all those controlled devices. When a common root key KEY-2 is available, the headend can broadcast one message MKEY containing the encryption/decryption key KEY-3 to be distributed to multiple controlled devices that have a common root key KEY-2.

Another embodiment includes an encryption/decryption key KEY-3 that is common to all controlled devices. In this case, the headend can transmit common MKEY and MAUTHORIZATION messages to the controlled devices that have the common KEY-3. The ability to cause authenticated mode transitions in multiple controlled devices simultaneously can substantially facilitate configuration of large service provider networks.

Yet another embodiment can include controlled devices that have at least one mode request message written, for example, into its OTP memory at the time of manufacture. For example, when it is known at the time of manufacture or initialization of an STB that the initial conditional access provider would be CA-A, a mode request can be written into its OTP memory to correspond to that conditional access provider. Then, upon connecting to a media distribution network, the STB can read the conditional access provider (or corresponding mode) in its OTP and transition into the unverified mode MODE-A-TEMP, as described in relation to FIG. 8 above. Subsequently, it can transition to active verified mode MODE-A after receiving the corresponding mode authorization message from CA-A.

Another embodiment can have a mode request as well as a corresponding mode authorization message written into a controlled device at the time of manufacture. For example, a mode request for conditional access provider CA-A, as well as a mode authorization for conditional access provider CA-A can be stored in the OTP memory 306 of STB 120 at the time of manufacture. The mode authorization can be stored in OTP memory in encrypted form, encrypted with key KEY-3. Then, when STB 120 is to be activated, for example, by connecting to media distribution network 111, the key KEY-3 can be received from headend 110 to decrypt the stored mode authorization and cause the change of mode. When STB 120 is coupled to media distribution network 111, headend 110 can send the key KEY-3 to STB 120 using a key message, such as MKEY, encrypted for example with a derived root key KEY-2 for conditional access provider A.

The embodiments above are described primarily based on symmetric key technology, where the encryption and decryption keys are identical. However, embodiments using asymmetric keys are also contemplated. For example, in one embodiment, headend key generator 210 in headend 110 can generate a pair of keys (e.g., KEY-3-PUBLIC and KEY-3-PRIVATE) in place of a single key KEY-3. It may then include KEY-3-PRIVATE in the corresponding MKEY message, and encrypt the corresponding MAUTHORIZATION message using KEY-3-PUBLIC.

The representative functions of the controlled device described herein can be implemented in hardware, software, or some combination thereof. For instance, processes 800 and 900 can be implemented using computer processors, computer logic, ASIC, FPGA, DSP, etc., as will be understood by those skilled in the arts based on the discussion given herein. Accordingly, any processor that performs the processing functions described herein is within the scope and spirit of the present invention.

Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A controlled device operable in a plurality of modes, the controlled device comprising:
    (a) at least one processor configured to receive a requested mode value and an encrypted secret key, wherein the requested mode value corresponds to one of the plurality of modes;
    (b) a non-volatile memory configured to hold at least one global root key;
    (c) a key deriver coupled to the non-volatile memory, comprising a plurality of key derivation functions, wherein each key derivation function of the plurality of key derivation functions includes an assigned mode value corresponding to one of the plurality of modes, and wherein said each key derivation function is configured to take as input the at least one global root key and produce a root key specific to the assigned mode value;
    (d) a key manager coupled to the key deriver and to the at least one processor, and configured to use the root key to decrypt the encrypted secret key to recover a secret key.

2. The controlled device of claim 1, further comprising:
    (e) a mode controller configured to verify a mode request by comparing one or more values from the mode request to a mode authorization message received from an authorizing entity for the requested mode, wherein the secret key is used to decrypt the mode authorization message.

3. The controlled device of claim 2, wherein the authorizing entity is a conditional access provider.

4. The controlled device of claim 3, wherein the controlled device is a set-top box.

5. The controlled device of claim 3, wherein the controlled device is a system-on-a-chip for a set-top box.

6. The controlled device of claim 1, further comprising:
    (e) a selector coupled to the key deriver, configured to select one key derivation function from the plurality of key derivation functions, wherein the assigned mode value of the one key derivation function matches the requested mode value.

7. The controlled device of claim 1, wherein one or both of the requested mode value and the encrypted secret key is received from a memory in the controlled device.

8. A media delivery system, comprising:
   (a) a media distribution network;
   (b) a media distribution center coupled to the media distribution network, comprising:
      (i) a global root key database having at least one global root key that is shared by one or more conditional access providers;
      (ii) one or more key derivation functions, wherein each key derivation function corresponds to one of the one or more conditional access providers, and wherein each key derivation function is configured to take as input the at least one global root key and to produce a root key that is specific to the one of the one or more conditional access providers;
      (iii) a key generator configured to generate at least one secret key; and
      (iv) a mode controller configured to generate a mode authorization message including the at least one secret key, wherein the mode authorization message is encrypted using the root key; and
   (c) at least one controlled device coupled to the media distribution network, and operable in a plurality of modes, the at least one controlled device including:
      (i) at least one control processor configured to receive a requested mode value and an encrypted secret key, wherein the requested mode value corresponds to one of the plurality of modes;
      (ii) a non-volatile memory configured to hold the at least one global root key;
      (iii) a key deriver coupled to the non-volatile memory, comprising a plurality of key derivation functions, wherein each key derivation function of the plurality of key derivation functions includes an assigned mode value corresponding to one of the plurality of modes, and wherein said each key derivation function is configured to take as input the at least one global root key and produce a root key specific to the assigned mode value;
      (iv) a selector coupled to the key deriver, configured to select one key derivation function from the plurality of key derivation functions, wherein the assigned mode value of the one key derivation function matches the requested mode value; and
      (v) a key manager coupled to the key deriver and to the at least one control processor, and configured to use the root key to decrypt the encrypted secret key to recover the secret key.

9. A method for changing a mode in a controlled device from a current mode, comprising:
   (a) selecting a target key derivation function from a plurality of key derivation functions, wherein the target key derivation function corresponds to a target mode, and wherein the target mode is one of a plurality of modes;
   (b) generating a target root key by providing a global root key as input to the target key derivation function; and
   (c) changing the mode in the controlled device from the current mode to the target mode using one or more keys from a key ladder, wherein the key ladder is initialized with the target root key.

10. The method of claim 9, further comprising:
   (d) receiving a command to change the mode from the current mode to the target mode.

11. The method of claim 9, wherein the changing step comprises:
   (i) using the target root key to recover an encryption/decryption key from a key distribution message.

12. The method of claim 9, wherein the changing step comprises:
   (i) decrypting a mode authorization message from an authorizing entity, wherein the decrypting is based on a key from the key ladder;
   (ii) verifying a change of the mode of the controlled device from the current mode to the target mode based on one or more contents of the mode authorization message; and
   (iii) setting the mode of the controlled device to the target mode.

13. The method of claim 12, wherein the verifying step comprises:
   comparing a mode value from the mode authorization message with a mode value from a mode request message.

14. The method of claim 13, further comprising:
   comparing a random value from the mode authorization message with a random value from a mode request message.

15. The method of claim 13, further comprising:
   comparing an epoch value from the mode authorization message with an epoch value maintained in the controlled device.

16. A method for changing a mode in a controlled device from a current mode, comprising:
   (a) selecting a current key derivation function from a plurality of key derivation functions, wherein the current key derivation function corresponds to the current mode;
   (b) generating a current root key by providing a global root key as input to the current key derivation function; and
   (c) changing the controlled device from the current mode to a target mode using one or more keys from a key ladder, wherein the key ladder is initialized with the current root key.

17. The method of claim 16, further comprising:
   (d) receiving a request from a current authorizing entity to change the mode from the current mode to the target mode.

18. The method of claim 17, wherein the changing step comprises:
   (i) decrypting a first mode authorization message from the current authorizing entity, wherein the decrypting is based on a key from the key ladder;
   (ii) verifying a change of the mode of the controlled device from the current mode to the target mode based on one or more contents of the first mode authorization message; and
   (iii) setting the mode of the controlled device to the target mode.

19. The method of claim 18, wherein the setting step comprises:
   operating the controlled device in an intermediate mode;
   selecting a target key derivation function from a plurality of key derivation functions, wherein the target key derivation function is assigned to the target mode;
   generating a target root key by providing a global root key as input to the target key derivation function; and
   changing the controlled device from the current mode to the target mode using one or more keys from a second key ladder, wherein the second key ladder is initialized with the target root key.

20. The method of claim 19, wherein the changing step of changing the controlled device from the current mode to the target mode using one or more keys from a second key ladder comprises:

decrypting at least one mode authorization message from a target authorizing entity, wherein the decrypting is based on a key from the second key ladder;

verifying a change of the mode of the controlled device to the target mode based on one or more contents of the mode authorization message; and setting the mode of the controlled device to the target mode.

\* \* \* \* \*